United States Patent
Ricard

(10) Patent No.: US 11,708,548 B2
(45) Date of Patent: Jul. 25, 2023

(54) PROCESS FOR EXPLOITING GAS EFFLUENTS FROM ALCOHOLIC FERMENTATION

(71) Applicant: SEDE ENVIRONNEMENT, Arras (FR)

(72) Inventor: Jean-Philippe Ricard, Bordeaux (FR)

(73) Assignee: SEDE ENVIRONNEMENT, Arras (FR)

( * ) Notice: Subject to any disclaimer, the term of this patent is extended or adjusted under 35 U.S.C. 154(b) by 668 days.

(21) Appl. No.: 16/642,952

(22) PCT Filed: Jul. 18, 2018

(86) PCT No.: PCT/EP2018/069485
§ 371 (c)(1),
(2) Date: Feb. 28, 2020

(87) PCT Pub. No.: WO2019/042654
PCT Pub. Date: Mar. 7, 2019

(65) Prior Publication Data
US 2020/0347329 A1    Nov. 5, 2020

(30) Foreign Application Priority Data
Aug. 29, 2017 (FR) ........................ 1757956

(51) Int. Cl.
*C12F 3/02* (2006.01)
*C01D 7/10* (2006.01)
*B01D 33/82* (2006.01)

(52) U.S. Cl.
CPC ............... *C12F 3/02* (2013.01); *B01D 33/82* (2013.01); *C01D 7/10* (2013.01); *B01D 2201/202* (2013.01); *C01P 2006/82* (2013.01)

(58) Field of Classification Search
CPC .......... C01D 7/10; C01P 2006/82; C12F 3/02; B01D 33/82; B01D 2201/202
See application file for complete search history.

(56) References Cited

U.S. PATENT DOCUMENTS 9,205,375 B2 * 12/2015 Jones .................. C01B 11/062
2006/0193765 A1   8/2006 Nakashima et al.
2018/0318754 A1 * 11/2018 Witarsa .................. C01C 1/26

FOREIGN PATENT DOCUMENTS

WO       2010056460 A2    5/2010

* cited by examiner

*Primary Examiner* — Richard M Rump
(74) *Attorney, Agent, or Firm* — Coats & Bennett, PLLC

(57) ABSTRACT

The present invention relates to a method for the valorization of gaseous effluents derived from alcoholic fermentation, comprising:
a step of alcoholic fermentation in a bioreactor producing a fermented matter and a gaseous effluent, wherein the gaseous effluent comprises carbon dioxide;
a step of extraction of the gaseous effluent from the bioreactor, followed by compression thereof, in order to obtain a compressed gaseous effluent; and
a step of production of a suspension of alkaline bicarbonate in a bicarbonate production unit, wherein the bicarbonate production unit is divided into at least two compartments arranged successively in series.

The present invention also relates to a corresponding plant.

13 Claims, 1 Drawing Sheet

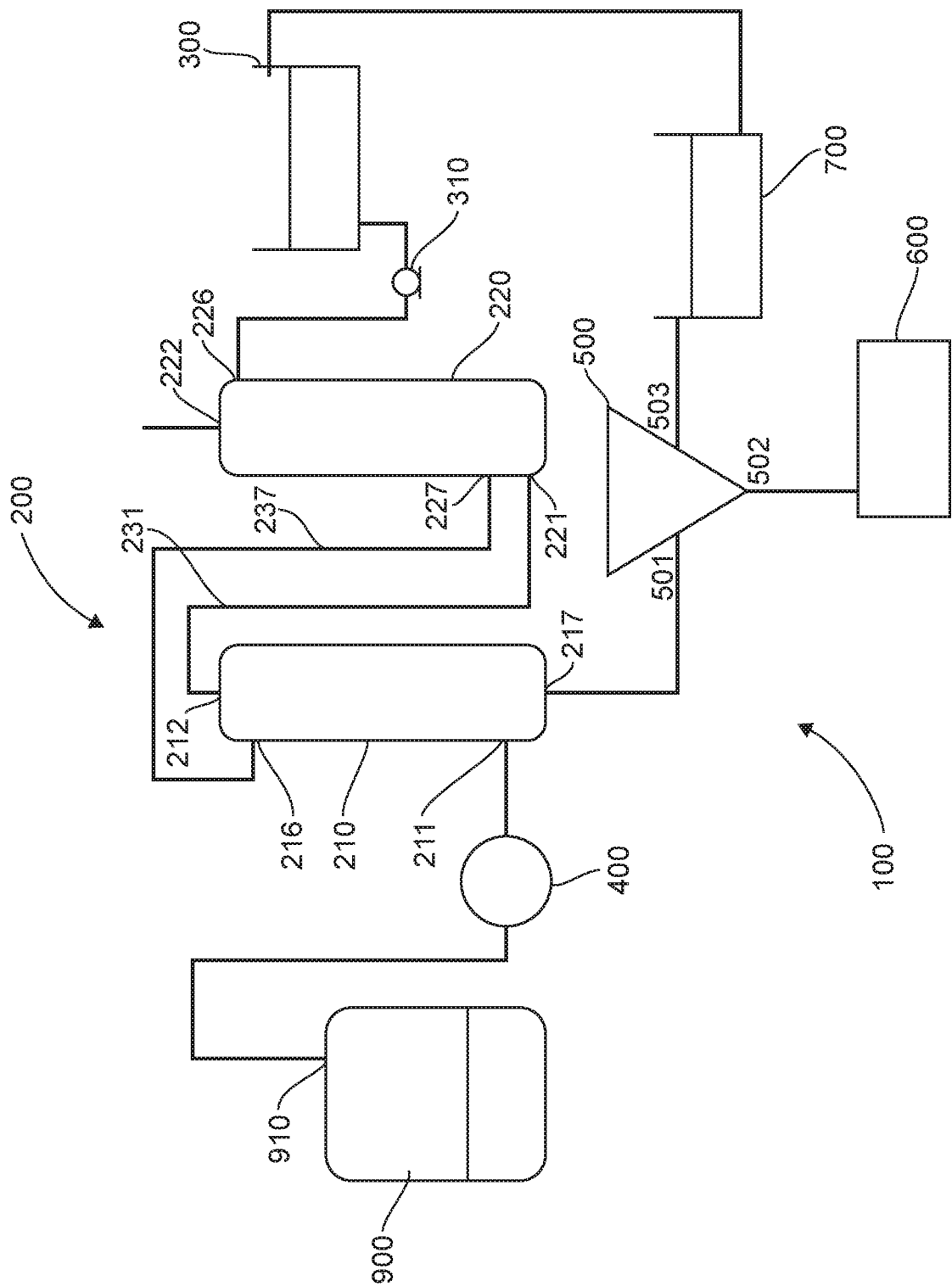

PROCESS FOR EXPLOITING GAS EFFLUENTS FROM ALCOHOLIC FERMENTATION

1. FIELD OF THE INVENTION

The field of the invention is that of the valorization of byproducts derived from alcohol or food fermentation, especially gaseous effluents comprising carbon dioxide.

More specifically, the invention relates to a method for the valorization of carbon dioxide derived from alcohol fermentation and a corresponding mobile plant.

2. PRIOR ART

Alcohol fermentation is a biochemical process in which sugars are converted into ethanol and into carbon dioxide in a liquid medium essentially deprived of air. It is commonly used in the manufacture of food items, especially alcoholic items such as wine, beer or sake and bakery products such as bread.

Methods for manufacturing food using alcohol fermentation also produce residues or byproducts. These byproducts, if suitably valorized, can provide a source of additional income. For example, in wine-making, an economically viable form of valorization of grape marc and/or wine lees can be obtained by distillation to recover ethanol, by use in methanization or else by use in composting.

The residues produced include, in particular, gaseous effluents. These can include different gases, depending on the raw materials that undergo food fermentation. These gases include especially carbon dioxide. It is sought to valorize these gases but this is difficult to achieve, especially in the very sites where alcohol fermentation is carried out.

Many methods have been devised for the industrial-scale recovery of carbon dioxide in high-carbon-dioxide emission industries, for example industries in the waste incineration and cement production sectors. However, the food manufacturing industries that use alcohol fermentation produce a far smaller quantity of carbon dioxide, making it economically unviable to valorize the carbon dioxide emitted. In addition, industrial-scale plants are unsuited to the processing of small quantities of carbon dioxide.

There is therefore a need for technical solutions enabling the valorization of gaseous effluents, especially carbon dioxide, in situ, i.e. at the very places of its production. There is also the need for economically viable technical solutions to valorize gaseous effluents obtained from alcohol fermentation.

3. GOALS

It is a goal of the invention to propose a method for the in situ valorization of gaseous effluents derived from alcohol fermentation.

The invention is also aimed at proposing an economically viable method for valorizing gaseous effluents derived from alcohol fermentation.

In particular, it is a goal of the invention to propose a method for the production of bicarbonate comprising a step of alcohol fermentation that is energy efficient and enables a high rate of conversion of the emitted carbon dioxide into bicarbonate.

It is another goal of the invention to propose a method for the production of bicarbonate comprising a step of alcohol fermentation that is robust and easily adaptable to variations in the flow rate of carbon dioxide.

It is also a goal of the invention to propose a mobile plant enabling the valorization in situ of gaseous effluents derived from alcohol fermentation.

In particular, it is a goal of the invention to propose a particularly compact mobile plant.

4. SUMMARY OF THE INVENTION

The present invention concerns a method for the valorization of gaseous effluents derived from alcohol fermentation comprising the following steps:
  alcohol fermentation in a bioreactor producing a fermented matter and a gaseous effluent, said gaseous effluent including carbon dioxide;
  extraction of the gaseous effluent from said bioreactor followed by its compression, in order to obtain a compressed gaseous effluent;
  production of a suspension of alkaline bicarbonate in a bicarbonate production unit, said bicarbonate production unit being divided into at least two compartments disposed successively in series, said step of production of a suspension of alkaline bicarbonate comprising:
    an introduction, at the lower part of the first compartment, of said compressed gaseous effluent,
    an introduction into the last compartment of a stock solution comprising an aqueous solution including a dissolved alkaline carbonate,
    a circulation in a counter-flow between a gas stream getting depleted in carbon dioxide and an aqueous solution getting depleted in carbonate ions in the at least two compartments disposed successively in series, and
    a precipitation of alkaline bicarbonate in the first compartment by reaction of dissolved carbon dioxide with carbonate ions in order to obtain a suspension of insoluble alkaline bicarbonate;
  and,
  a recovery of the insoluble alkaline bicarbonate suspension from the first compartment followed by a step of filtration or decantation of the suspension of insoluble alkaline bicarbonate, in order to obtain a wet residue of alkaline bicarbonate and an aqueous phase.

Thus, the inventors of the present invention have succeeded in proposing a method for the valorization in situ of gaseous effluents derived from alcohol fermentation by a specific combination of unitary operations to produce a wet residue of alkaline bicarbonate. This method is economically viable for converting carbon dioxide at relatively low flow rates and is also adaptable to variations in the flow rate of carbon dioxide. It can be implemented simply, in a mobile plant of a particularly compact size.

In addition, controlled conditions described in detail here below in preferred embodiments provide for an optimal rate of conversion of carbon dioxide into bicarbonate as well as a high yield and sufficient purity in terms of alkaline bicarbonate. The term "controlled conditions" is understood to mean specific conditions, especially conditions of pressure and temperature for the gases and conditions of concentration and temperature for the liquids.

The step of alcohol fermentation enables the production of a gaseous effluent. Indeed, alcohol fermentation is a biochemical process by which sugars are converted especially into ethanol and carbon dioxide in a liquid medium essentially deprived of air. It is implemented in a bioreactor by microorganisms capable of alcohol fermentation in a substrate containing these sugars. The step of alcohol fermentation is generally carried at a temperature of 10° C. to 45° C. It is carried out in particular at a temperature of 12° C. to 20° C. for the vinification of white wines. It is carried out in particular at a temperature of 25° C. to 40° C. for the vinification of red wines.

The gaseous effluent derived from alcohol fermentation comprises carbon dioxide. The gaseous effluent can also contain volatile aromas or impurities derived from alcohol fermentation. The gaseous effluent advantageously has a flow rate of 30 m³/h to 100 m³/h. Depending on the nature of the alcohol fermentation used, the volume fraction of carbon dioxide in gaseous effluent ranges from 35% to 99%.

The step of extraction of gaseous effluent from the bioreactor followed by the step of compression of the gaseous effluent gives a compressed gaseous effluent. Preferably, the gaseous effluent is compressed at a pressure of 1.3 barA to 3 barA (or bars absolute). The pressure can be adapted to the variations of the flow of the gaseous effluent and/or the volume fraction in carbon dioxide of the gaseous effluent. The greater the compression pressure, the higher the partial pressure of the carbon dioxide present in the compressed gaseous effluent: this is necessary for an efficient mass transfer from carbon dioxide gas into carbon dioxide dissolved in aqueous solution.

A Venturi-effect vacuum pump or a liquid ring compressor are advantageously used to implement the step of extraction of the gaseous effluent from the bioreactor followed by the step of compression of the gaseous effluent. These compressors are interesting because they are low-cost and compact devices requiring little maintenance. In addition, they can adapt easily and rapidly to variations in the flow rate of the gaseous effluent so as not to disturb the alcohol fermentation in the bioreactor.

In one particular embodiment of said method the volume fraction of carbon dioxide in said gaseous effluent ranges from 35% to 99% and the pressure of said compressed gaseous effluent ranges from 1.3 bar(a) to 3 bar(a) (bars absolute).

Optionally, the gaseous effluent extracted from the bioreactor can be cooled before being compressed. This leads to the condensation of a part of the water and of the volatile aromas or of the impurities and increases the volume fraction of carbon dioxide in the gaseous effluent. In the case of a liquid ring compressor, the cooling of the gaseous effluent in addition maintains high capacity of compression of the liquid ring. The gaseous effluent is advantageously cooled to a temperature of 5° C. to 15° C.

The stock solution comprising carbonate ions ($CO_3^{2-}$) has a concentration in carbonate ions ranging from 2.5 mol/L to 6 mol/L (namely a solution of carbonate ions of 15% to 36% by weight), at a temperature ranging from 20° C. to 40° C. It is prepared at a temperature of 20° C. to 40° C. in a storage vessel. Advantageously, the stock solution is a solution saturated in carbonate solutions. The value of this feature is that it procures efficient kinetics of reaction between the carbonate ions of the stock solution and the carbon dioxide dissolved in solution to form bicarbonate ions.

The stock solution is preferably an alkaline carbonate solution. It can especially be a solution of sodium carbonate or potassium carbonate.

The stock solution preferably has a pH value of 7 to 10 and very preferably a pH value of 8 to 9. The stock solution can in particular have a pH of 8.5. Indeed, these ranges of pH value centered on 8.5 correspond to the field of predominance of the bicarbonate ions ($HCO_3^-$) relative to the carbonate ions ($CO_3^{2-}$) and carbonic acid ($H_2CO_3$).

The stock solution can also have other species dissolved in solution. It can especially contain at least one other alkaline salt. In particular, the stock solution can contain a hydroxide alkaline salt and/or a chloride alkaline salt, the alkaline counter-ion being preferably of the same type as that of the alkaline carbonate.

The step of production of the insoluble alkaline bicarbonate suspension is implemented in a bicarbonate production unit. The bicarbonate production unit is divided into at least two compartments disposed successively in series.

The at least two compartments can be disposed successively one on top of the other vertically. This makes it possible to obtain a bicarbonate production unit with a very small floor space but a great ground height, or they can be disposed successively one beside the other, giving a bicarbonate production unit with a reasonable ground height and a reasonable floor space or else they can be disposed according to a combination of these two modes. According to one particular embodiment of the invention, the compartments of the bicarbonate production unit are bubble columns having a base measuring approximately 0.3 m² to 0.7 m² and a height of 2 m to 2.5 m. In particular, they are meant to be placed in a container, for example a shipping container, so as to be easily transported from one production place, in which alcohol fermentation is carried out, to another production place.

The compressed gaseous effluent is introduced into the lower part of the first compartment. It is advantageously introduced into the first compartment by trays with fine bubbles giving a large gas/liquid exchange surface and thus favoring the mass transfer from carbon dioxide gas into carbon dioxide dissolved in an aqueous solution. The gas stream comprising carbon dioxide passes through the entire first compartment up to an upper part of the first compartment and is then sent to the lower part of the second compartment and so on and so forth up to the last compartment. The carbon-dioxide-depleted excess gas that has reached the upper part of the last compartment can be recovered at the upper part of the last compartment.

The stock solution is introduced into the last compartment. It is preferably introduced into the upper part of the last compartment and then recovered at the lower part of the last compartment. The aqueous solution comprising carbonate ions is then sent into the last but one compartment, preferably at the upper part, and then recovered preferably at the lower part and so on and so forth until the first compartment.

The reaction balance between the dissolved carbon dioxide and carbonate ions, producing bicarbonate ions is:

$$CO_2(aq)+H_2O+CO_3^{2-}(aq) \Leftrightarrow HCO_3^-(aq);$$

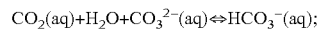

Once the saturation (or even the over-saturation) of the aqueous solution in bicarbonate ions has been attained, the bicarbonate ions precipitate to form a suspension of insoluble alkaline bicarbonate.

Within the bicarbonate production unit, there is therefore a counter-current circulation between a gas stream getting depleted in carbon dioxide and an aqueous solution getting depleted in carbonate ions in compartments disposed successively in series. The reaction of the dissolved carbon dioxide with the carbonate ions in the first compartment enables mainly the precipitation of the bicarbonate ions to form a suspension of insoluble alkaline bicarbonate. The reaction of the carbon dioxide with the carbonate ions in the following compartment or compartments enables mainly the saturation (or even the over saturation) of the aqueous solutions in bicarbonate ions and the carbon dioxide exhaustion of the gas stream. A precipitation of insoluble alkaline bicarbonate can, in certain modes of implementation, also be observed in the following compartment or compartments.

The counter-flow circulation in the compartments disposed successively in series is advantageously implemented in each of the compartments of the bicarbonate production unit by:
i) the filling of the compartment with a carbonate-ion-rich aqueous solution up to a high level of the compartment,
ii) the introduction of a carbon-dioxide-rich gas stream into the lower part of the compartment,
iii) the recovery of a gas stream depleted in carbon dioxide in the upper part of the compartment, and,
iv) the draining away of aqueous solution depleted in carbonate ions up to a low level of the compartment.

Advantageously, the filling of the compartment with an aqueous solution rich in carbonate ions and the draining away of an aqueous solution depleted in carbonate ions takes place sequentially. Advantageously, the introduction of a gas stream rich in carbon dioxide and the recovery of a gas stream depleted in carbon dioxide takes place continuously.

For a given compartment, the aqueous solution rich in carbonate ions is the stock solution if the compartment is the last of the compartments. If not, it corresponds to the carbonate-ion-depleted solution of the next higher compartment. For a given compartment, the carbonate-ion-depleted aqueous solution is the suspension of insoluble alkaline bicarbonate recovered if the compartment is the first compartment. If not, it corresponds to the carbonate-ion-rich aqueous solution of the next lower compartment.

For a given compartment, the carbon-dioxide-rich gas stream is the compressed gaseous effluent if the compartment is the first compartment. If not, it corresponds to the carbon-dioxide-depleted gas stream of the next lower compartment. For a given compartment, the carbon-dioxide-depleted gas stream is the excess gas recovered if the compartment is the last compartment. If not, it corresponds to the carbon-dioxide-rich gas stream of the next higher compartment.

The expressions "next higher" and "next lower" are to be understood in taking the compartments to be disposed in series one after the other, the lowest compartment being the first compartment, the highest compartment being the last compartment.

Counter-flow circulation is particularly suitable because of the relatively small quantity of carbon dioxide produced by alcohol fermentation.

The temperature within said at least two compartments is preferentially maintained at a value of 20° C. to 45° C.

According to one particular embodiment of the invention, the bicarbonate production unit is divided into two compartments in series. In this embodiment, the temperature of the second compartment is maintained at a temperature of 20° C. to 40° C. The utility of this feature is that the operating temperature in the first compartment attains the value of 20° C. to 45° C., preferably a value close to 40° C., because of the exothermal nature of the reaction of formation of bicarbonate ions and of their crystallization. Indeed, it is in this range of temperatures that the difference between the saturation points of the carbonate ions and of the bicarbonate ions is the maximum. Thus, in the first compartment, the precipitation of alkaline bicarbonate is favored relative to the precipitation of the alkaline carbonate.

The step of recovery of the suspension of insoluble alkaline bicarbonate from the first compartment followed by the step of filtration or decantation of the insoluble alkaline bicarbonate suspension gives a wet residue of alkaline bicarbonate and an aqueous phase.

The step of recovery of the suspension of insoluble alkaline bicarbonate from the first compartment can especially be initiated when the pH in the first compartment goes below a threshold pH value ranging from 8 to 9, for example 8.5. The first compartment can then be emptied until a low level of liquid, for example, 20 cm of liquid, is attained.

In the case of filtration of the suspension of insoluble bicarbonate, this filtration is preferably done by means of a rotary filter under reduced pressure using a liquid ring pump. The water from the liquid ring can advantageously be recycled to prepare the stock solution via a buffer tank.

The wet residue of alkaline bicarbonate generally comprises 20% to 50% of water by weight.

The aqueous solution obtained at the end of the filtration step or decantation step is a carbonate-ion-depleted aqueous solution. It has a carbonate ion concentration generally ranging from 0.4 to 2 mol/L. Advantageously, the aqueous solution can be recycled to prepare the stock solution, especially via a buffer tank.

Optionally, the method can comprise a step for drying the wet residue of alkaline bicarbonate, making it possible to obtain a dry residue of alkaline bicarbonate.

The optional step of drying the wet residue of alkaline bicarbonate is preferably implemented in a rotary dryer supplied continuously or discontinuously. The heat sources used in the rotary dryer are adapted according to the availability and can be smoke, a loop of thermal fluid, etc.

The dry residue of alkaline bicarbonate comprises 0.5 to 5% of water by weight.

Thus, one particular embodiment of the method comprises a step for drying said wet residue of alkaline bicarbonate in order to obtain a dry residue of alkaline bicarbonate, said dry residue of alkaline bicarbonate comprising 0.5% to 5% by weight of water.

The present invention also relates to a mobile plant for the valorization of gaseous effluents derived from alcohol fermentation into alkaline bicarbonate. The mobile plant comprises:
a unit for the production of bicarbonate comprising at least two compartments disposed successively in series: the bicarbonate production unit comprises an injection point for compressed gas at the lower part of the first compartment, a point for removal of an aqueous suspension in said first compartment, an injection point for aqueous solution in the last compartment, means of counter-flow circulation for gas and for liquid between each successive compartment;
a means for injecting a compressed gaseous effluent, connected to the injection point for gases of the first compartment and adapted to being connected detachably to a point of extraction of the gaseous effluents from an alcohol fermentation bioreactor, the means for injecting a compressed gaseous effluent comprising a compressor;
a storage vessel for an aqueous solution of alkaline carbonate;
a means for injecting aqueous solution connected to said storage vessel and said injection point for aqueous solution in the last compartment; and
a means of removal and filtration connected to said point of removal of an aqueous suspension from said first compartment.

5. FIGURES

Other features and advantages of the invention shall appear from the following description of an example of a plant according to the present invention used to implement the method according to the present invention. This description is accompanied by an appended drawing: FIG. 1 represents a schematic diagram of a plant according to the present invention connected to a bioreactor for alcohol fermentation.

6. EXAMPLE OF A MOBILE PLANT AND METHOD ACCORDING TO THE INVENTION

6.1 Mobile Plant

As is shown in FIG. 1, the plant (100) can be connected detachably to a bioreactor (900). Such a plant is possibly mobile and can be moved to different geographical sites, especially when the bioreactor (900) does not work continuously throughout the year.

The plant (100) comprises in particular: a bicarbonate production unit (200), a storage vessel (300), a compressor (400), a filtration unit (500), a dryer unit (600) and a buffer vessel (700).

The bicarbonate production unit (200) is composed of two columns (210; 220) disposed in series one beside the other. Each of the two columns (210; 220) is about 600 mm wide, about 900 mm long and about 2200 mm high. Each of the columns can be equipped with sensors (not shown), especially pressure, temperature, pH or level sensors.

Each of the columns (210; 220) comprises, at its lower part, gas injection points (211; 221) and a liquid removal point (217; 227) and at its upper part, a gas removal point (212; 222) and a liquid introduction point (216; 226). A pipe or conduit for gas (231) connecting a gas removal point (212) of the first column (210) and gas injection points (221) of the second column (220) and a conduit for liquid (237) connecting the liquid introduction point (216) of the first column (210) and the liquid removal point (227) of the second column (220) form means of counter-flow circulation for gas and for liquid between the first column (210) and the second column (220).

The bioreactor (900) is a bioreactor suited to the alcohol fermentation of microorganisms. A gaseous effluent extraction point (910) enables the removal of the gaseous effluent comprising carbon dioxide produced by alcohol fermentation.

A means of injection of a compressed gaseous effluent connects the gas injection point (211) of the first column (210) and can be adapted to the gaseous effluent extraction point (910) of the bioreactor (900). It comprises especially a compressor (400) and piping systems for gases. The compressor (400) can be, in particular, a liquid ring compressor or a Venturi-effect compressor.

The storage vessel (300) is suited to preparing an aqueous solution of alkaline carbonate.

A means of injection of aqueous solution connects the storage vessel (300) to the liquid introduction point (226) of the second column (220). It comprises especially a pump (310) and conduits for liquid.

The filtering unit (500) is adapted to filtering a suspension of alkaline bicarbonate. It can especially be composed of a rotary filter placed under reduced pressure by means of a liquid ring pump. It comprises an inlet (501) for a suspension to be filtered and two outlets, the first outlet (502) enabling the recovery of a wet solid residue and the second outlet (503) enabling the recovery of a filtrate.

The inlet (501) for a suspension to be filtered is connected by a conduit to the liquid removal point (217) of the first column, the first outlet (502) is connected to the dryer unit (600) and the second outlet (503) is connected to the storage vessel (700).

The dryer unit (600) can be a rotary dryer that is supplied continuously or discontinuously. The heat source used in the dryer is adapted to availability in the proximate environment. In particular, it can be comprised of smoke, a thermal fluid loop, etc.

The buffer vessel (700) is connected to the storage vessel (300) by a conduit, making it possible to partly supply the storage vessel (300) with aqueous alkaline carbonate solution.

The conduits used in the plant (100) furthermore comprise control means. These can be, in particular, two-way or three-way valves, the purpose of which is to keep the solutions and suspensions in motion in order to avoid problems related to crystallization.

6.2 Method

The following method was implemented in the plant described here above.

Alcohol fermentation in the bioreactor (900) was used to extract a gaseous effluent having a volume fraction in carbon dioxide of 80% with a flow rate of 50 $Nm^3/h$ (normal cubic meters per hour). The gaseous effluent was cooled to a temperature of 10° C. and compressed by means of the liquid ring compressor (400).

The stock solution of sodium carbonate was prepared at a temperature of 40° C. in a storage vessel (300).

A suspension of insoluble sodium bicarbonate was obtained by:
- introducing compressed gaseous effluent at the gas injection point (211) of the first column (210),
- introducing the stock solution of sodium carbonate at the liquid injection point (226) of the second column (220),
- counter-flow circulation in the first column (210) and second column (220) between a carbon-dioxide-depleted gas stream and a carbonate-ion-depleted aqueous solution,
- precipitation of insoluble sodium bicarbonate in the first column at a temperature of 35° C.,
- recovering the suspension of insoluble sodium bicarbonate from the first column at the liquid removal point (217), followed by a step of filtration through the filtering unit (500).

The wet residue obtained was dried by means of the dryer unit (600). The filtrate was recirculated in the storage vessel (300) via the buffer vessel (700).

More specifically, the counter-flow circulation in the first column (210) and second column (220) was implemented by:
- initial filling of the first column (210) and second column (220) with the stock solution of sodium carbonate,
- the continuous introduction of the compressed gaseous effluent at the lower part of the first column (210) until it attains a pH value of 8.5, the continuous recovery of a carbon-dioxide-depleted gas stream at the upper part of the first column (210), the continuous introduction at the lower part of the second column (220) and the continuous recovery of an even more carbon-dioxide-depleted gas stream at the upper part of the second column (220),
- the draining of the first column (210) until a liquid level of 20 cm is attained (during the draining, there is no stopping of injection of gaseous effluent and a pump is put into the operation to prevent the formation of sodium bicarbonate deposits), once the draining of the first column (210) has been completed, filling the first column (210) by draining the carbonate-ion-depleted aqueous solution of the second column (220), filling the second column (220) with the stock solution of sodium carbonate, etc.

Thus, the filling and the draining of the first column (210) and second column (220) with aqueous sodium carbonate solution takes place sequentially. On the contrary, the introduction and the recovery of gas stream in the first column (210) and second column (220) take place continuously. The residence time of the carbon dioxide in each of the columns, namely the first column (210) and the second column (220), ranges from 5 seconds to 1 minute.

This method made it possible to obtain 90% consumption of the carbon dioxide derived from alcohol fermentation and a purity of 90% to 97% for the sodium bicarbonate obtained.

The invention claimed is:

1. A method for valorization of gaseous effluents derived from an alcohol fermentation process comprising:
    fermenting alcohol in a bioreactor and producing fermented matter and a gaseous effluent containing carbon dioxide;
    extracting the gaseous effluent from said bioreactor;
    after extracting the gaseous effluent from the bioreactor, compressing the gaseous effluent to form a compressed gaseous effluent;
    producing a suspension of an alkaline bicarbonate in a bicarbonate production unit having at least first and second compartments disposed in series and comprising:
        introducing into the second compartment an aqueous solution containing dissolved alkaline carbonate;
        introducing the compressed gaseous effluent into the lower part of the first compartment;
        directing the compressed gaseous effluent through the first and second compartments where the compressed gaseous effluent contacts the aqueous solution which produces a gas stream depleted in carbon dioxide and wherein the aqueous solution becomes depleted in carbonate ions;
        precipitating an alkaline bicarbonate in the first compartment by reacting dissolved carbon dioxide with the dissolved alkaline carbonate of the aqueous solution to produce a suspension of insoluble alkaline bicarbonate;
        recovering the suspension of insoluble alkaline bicarbonate from the first compartment; and
        filtering or decanting the suspension of insoluble alkaline bicarbonate to produce a wet residue of alkaline bicarbonate and an aqueous phase.

2. Method according to claim 1, wherein the volume fraction of carbon dioxide in said gaseous effluent ranges from 35% to 99% and in that the pressure of said compressed gaseous effluent ranges from 1.3 bar(a) to 3 bar(a) (bars absolute).

3. Method according to claim 1, wherein said aqueous solution comprises sodium carbonate and/or potassium carbonate.

4. Method according to claim 1, wherein said aqueous solution has a concentration in carbonate ions ranging from 2.5 mol/L to 6 mol/L at a temperature ranging from 20° C. to 40° C.

5. Method according to claim 1, wherein said aqueous solution has a pH value of 7 to 10.

6. The method of claim 1 wherein the aqueous solution is introduced into the first and second compartments; and after the aqueous solution is introduced into the first and second compartments, the method comprises directing the compressed gaseous effluent into the lower portion of the first compartment after which the compressed gaseous effluent moves through the first and second compartment and in the process the compressed gaseous effluent becomes depleted in carbon dioxide.

7. Method according to claim 1, wherein the temperature within said at least two compartments is maintained at a value of 20° C. to 45° C.

8. Method according to claim 1, wherein it comprises a step for drying said wet residue of alkaline bicarbonate, in order to obtain a dry residue of alkaline bicarbonate, said dry residue of alkaline bicarbonate comprising 0.5% to 5% by weight of water.

9. Method according to claim 1, wherein said aqueous phase obtained at the end of said step of filtration or decantation is recycled for the preparation of said aqueous solution.

10. The method of claim 1, including after extracting the gaseous effluent from the bioreactor, cooling the gaseous effluent.

11. The method of claim 1, including extracting the gaseous effluent from the bioreactor with a Venturi-effect vacuum pump and compressing the extracted gaseous effluent with a liquid ring compressor.

12. The method of claim 1, wherein the first and second compartments comprise first and second columns connected in series; and the method further includes at various times filling the first compartment with the aqueous solution by directing the aqueous solution, depleted in carbonate ions, from the second column into the first column.

13. The method of claim 1, including moving the compressed gas effluent through the aqueous solution contained in the first and second compartments; as the compressed gaseous effluent moves through the first compartment, reacting dissolved carbon dioxide with the carbonate ions of the aqueous solution in the first compartment which enables the precipitation of bicarbonate ions that form at least a part of the suspension of the insoluble alkaline bicarbonate; and wherein as the compressed gaseous effluent moves through the second compartment, reacting carbon dioxide with carbonate ions in the second compartment which gives rise to the saturation or oversaturation of the aqueous solution in biocarbonate ions.

* * * * *